3,541,161
PROCESS FOR PREPARING PRIMARY ALKANOLS FROM 4,4-DIALKYL-METADIOXANES
Gianfranco Pregaglia and Gregorio Guglielmo, Milan, Italy, assignors to Montecatini Edison S.p.A., Milan, Italy, a corporation of Italy
No Drawing. Continuation of application Ser. No. 505,055, Oct. 24, 1965. This application Apr. 12, 1968, Ser. No. 721,119
Claims priority, application Italy, Dec. 30, 1964, 27,665/64
Int. Cl. C07c 31/02
U.S. Cl. 260—632      9 Claims

ABSTRACT OF THE DISCLOSURE

Described is a process for preparing primary alkanols by hydrogenolysis of 4,4-dialkyl-metadioxanes in which a first alkyl is methyl or ethyl and the other alkyl contains 1 to 5 carbon atoms. The process comprises reacting the metadioxane with hydrogen at temperatures of 120–220° C. under hydrogen pressures from 20 to 200 atm., in the presence of Raney nickel and anhydrous zinc chloride, in a low molecular weight alkanol anhydrous medium.

---

This is a continuation of our application Ser. No. 505,055, filed Oct. 24, 1965, now abandoned, and relates to a method of preparing primary saturated aliphatic alkanols from dialkyl-metadioxanes.

Olefins of the formula

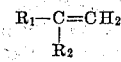

are known to react in aqueous formaldehyde solutions, acidified with mineral acids, to give compounds having the structure of metadioxanes, of the type

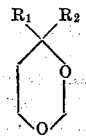

in which $R_1$ and $R_2$ can be the same or different alkyl.

Methods are also known for obtaining primary aliphatic alcohols from the said metadioxanes, according to the reaction:

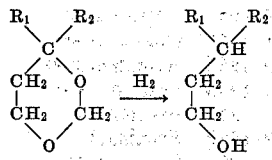

More particularly, the following methods are known:

(A) Acid methanolysis of metadioxanes to give unsaturated alcohols which can then be hydrogenated to the corresponding saturated alcohols (P. G. Sergheev, L. A. Ivanova; Tr. Nauch Issled Inst. Sint. Spirtov, I. Org. Pr. 1960–2, 256). This method has the drawback of requiring two successive stages. The total yields of saturated alcohol in some cases are rather low. For instance 4-methyl-4-propyl-metadioxane is converted into 3-methylhexanol with yields less than 50%.

(B) Direct hydrogenolysis of metadioxanes is described in U.S. Pat. No. 2,721,223 carried out in the presence of copper chromite catalyst at high temperatures under high hydrogen pressures. This method is particularly useful for the reduction with good yields of the metadioxanes deriving from olefins with 4 or 5 carbon atoms (e.g., 4,4-dimethylmetadioxane). The pressures are in the order of 1200 to 2000 p.s.i.g. and the temperature is 215 to 250° C. In the case of metadioxanes from olefins with 6 or more carbon atoms, even when operating at higher temperatures, the reduction requires very long times in order to reach high conversions into aliphatic alcohol.

On the other hand, it is economically inconvenient to recycle the nonreduced metadioxanes, since their separation from the product alcohols is difficult.

Methods of hydrogenolysis which give good yields of primary alcohols deriving from olefins with 6 or more carbon atoms in reasonable times were not known prior to the present invention. In the case of hydrogenolysis catalyzed by nickel, mixtures of ethers, by the preferential opening of one or the other of the —C—O— bonds present in the metadioxane molecule, are obtained (German Patent No. 877,601).

We have now surprisingly found, and this is an object of our invention, that it is possible to carry out the hydrogenolysis of metadioxanes of the formula

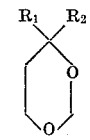

wherein $R_1$ is a methyl or ethyl group and $R_2$ an alkyl group containing from 1 to 5 carbon atoms, by operating in the presence of catalysts on the basis of Raney nickel and zinc chloride. Examples of metadioxanes capable of reacting according to the described process are: 4,4-dimethylmetadioxane, 4-methyl-4-propylmetadioxane, 4-ethyl-4-butylmetadioxane to yield alcohols respectively with 5, 7 and 9 carbon atoms. The above formula also includes 10 carbon atoms so that a limited range may be from 7 to 10 carbon atoms.

Using our catalytic system makes it possible to obtain, in a single stage, a practically complete conversion of metadioxane into saturated alcohol within relatively short time. Another remarkable advantage offered by our process is that it is possible to convert the reacting dioxane almost completely, thereby avoiding the problem of its separation from the alcohols obtained by hydrogenolysis.

By operating in the presence of the Raney nickel/zinc chloride system under relatively moderate reaction conditions (e.g., 180–190° C. and 120 atm. of hydrogen) for 12 hours, it is possible to reduce the amount of residual metadioxane in the reaction mixture to less than 4%. On the contrary, by operating in the presence of copper chromite as the catalyst, according to the prior art with ethanol as the solvent, the residual metadioxane, even under the most drastic operating conditions (e.g., 240° C. and total 220 atm. for 20 hours), is never less than 8–10% of the initial amount.

We carry out the hydrogenolysis in solution in a low molecular weight alcohol, preferably an alkanol with up to 4 carbon atoms, such as methanol or ethanol, which is used in amounts between 0.1 and 9 parts by weight per 1 part of metadioxane. The amount of Raney nickel must be between 0.1% and 20% by weight of the present metadioxane. In order to reduce the reaction time, between 5% and 10% is preferable. Zinc chloride is added in an amount between 0.1 and 5% by weight of metadioxane, and preferably between 2 and 4%. It is in general convenient to operate in the absence of water and for this purpose anhydrous zinc chloride is used.

The suspension is kept in agitation under a hydrogen atmosphere under a hydrogen pressure comprised between 20 and 200 atm. at a temperature of 120–220° C. In order to reach as complete a conversion as possible and to avoid the formation of side products, it is preferable to operate at temperatures between 175 and 190° C. under hydrogen pressure between 90 and 130 atm. The pressures reported in the specification are expressed in absolute atm.

The following examples illustrate the invention without limiting its scope.

EXAMPLE 1

A solution of 0.3 g. of anhydrous $ZnCl_2$ in 15 cc. of methanol is prepared and 7 g. of 4-methyl-4-propylmetadioxane (prepared from 2-methyl-1-pentene and formaldehyde) are added thereto. The solution is placed in a stainless steel autoclave provided with a heating jacket and with an oscillating support. 0.6 g. of Ni-Raney are added under nitrogen. Hydrogen is pumped and the whole is heated to 180° C. while agitating up to a total pressure of 140 atm. (corresponding to 115 atm. of hydrogen). After 12 hours the total pressure is decreased to 120 atm. After cooling, the suspension is discharged, the insoluble catalytic residue is removed by filtration and methanol is distilled off. The distillation residue is washed with a little water in order to remove zinc chloride and is then distilled under reduced pressure to yield 5 g. of 3-methylhexanol between 67 and 70° under 12 mm. Hg.

The purity of the product thus obtained, determined by chromatography in the vapor phase, is of the order of 96%.

EXAMPLE 2

By operating as described in Example 1, 7 g. of 4-methyl-4-propylmetadioxane are added to a solution of 200 mg. of anhydrous $ZnCl_2$ in 4 cc. of methanol. The hydrogenation, in the presence of 0.6 g. of Raney-Ni, is carried out at 190-195° C., with an initial pressure of 150 atm. (corresponding to 115 atm. of hydrogen). After 6 hours the pressure is decreased to 130 atm. The product is recovered by operating as in Example 1.

The purity of 3-methylhexanol, determined by chromatography in the vapor phase, is of about 90%. Among the side products, unsaturated alcohols are present together with 5% of unreacted metadioxane.

By operating under the aforementioned conditions in the presence of copper chromite catalyst in lieu of our catalyst, the yields of 3-methylhexylic alcohol do not exceed 75-80%. Higher yields are obtained under much more drastic conditions. For instance, yields of 90% of saturated alcohol in the final product are obtained only at 240° C. under total 220 atm. with a copper chromite amount corresponding to 20% by weight of metadioxane. The reaction time was 20 hours. By chromatography in the vapor phase, an amount of unreacted metadioxane of about 8% in respect to the crude product is found in the 3-methylhexanol thus obtained, together with smaller amounts of other impurities.

We claim:

1. A process for preparing primary alkanols having from 7 to 10 carbon atoms by hydrogenolysis of 4,4-dialkyl-metadioxanes in which a first alkyl is methyl or ethyl and the other alkyl contains 1 to 5 carbon atoms, which comprises reacting the metadioxane with hydrogen at temperatures of 120-220° C. under hydrogen pressures from 20 to 200 atm., in the presence of Raney nickel and anhydrous zinc chloride, in an anhydrous medium consisting of a low molecular weight alkanol.

2. The process of claim 1, wherein the temperature is 175-190° C. under hydrogen pressures between 90 and 130 atm.

3. The process of claim 1, wherein the amount of Raney nickel is between 0.1 and 20% by weight in respect of the metadioxane amount used.

4. The process of claim 1, wherein the amount of zinc chloride is between 0.1 and 5% by weight in respect of the metadioxane amount used.

5. A process according to claim 1, characterized in that methanol or ethanol is used as the solvent.

6. A process of preparing primary alkanols having from 5 to 10 carbon atoms by hydrogenolysis of 4,4-dialkyl-metadioxanes of the formula

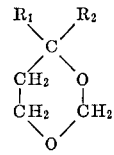

wherein $R_1$ is selected from the group consisting of methyl and ethyl; $R_2$ is selected from the group consisting of alkyl from 1 to 5 C, which comprises reacting the 4,4-dialkyl-metadioxane with hydrogen at a temperature from 175 to 190° C. under a hydrogen pressure of 90 to 130 atm. in the presence of a catalyst of 5 to 10% Raney nickel and 2 to 4% anhydrous zinc chloride, both by weight with respect to the 4,4-dialkyl-metadioxane, in the presence of a solvent selected from the group consisting of methanol and ethanol.

7. The process of preparing 3-methylhexanol by hydrogenolysis of 4-methyl-4' - propyl-metadioxane, which comprises reacting the 4-methyl-4'-propyl-metadioxane with hydrogen at a temperature from 175 to 190° C. under a hydrogen pressure of 90 to 130 atm. in the presence of a catalyst of 5 to 10% Raney nickel and 2 to 4% anhydrous zinc chloride, both by weight with respect to the 4-methyl-4'-propyl-metadioxane, in the presence of a solvent selected from the group consisting of methanol and ethanol.

8. The process of claim 3, wherein the amount of Raney nickel is between 5 and 10% by weight in respect to the amount of the metadioxane used.

9. The process of claim 4, wherein the amount of zinc chloride is between 2 and 4% by weight in respect to the amount of the metadioxane used.

References Cited

UNITED STATES PATENTS

| | | |
|---|---|---|
| 2,604,493 | 7/1952 | Copenhaver. |
| 2,700,685 | 1/1955 | Cooper et al. |
| 2,721,223 | 10/1955 | Arundale et al. |
| 2,752,399 | 6/1956 | Grimme et al. |
| 2,888,492 | 5/1959 | Fischer et al. |
| 3,052,730 | 9/1962 | Eschinazi. |
| 3,102,150 | 8/1963 | Hunter et al. |

LEON ZITVER, Primary Examiner

J. E. EVANS, Assistant Examiner